United States Patent
Santiago et al.

(10) Patent No.: US 9,749,783 B2
(45) Date of Patent: Aug. 29, 2017

(54) SYSTEM AND METHOD FOR ESTIMATING WIRELESS DEVICE POSITIONS

(71) Applicant: The Boeing Company, Chicago, IL (US)

(72) Inventors: Rodolfo A. Santiago, Bellevue, WA (US); Thomas Goff, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/987,103

(22) Filed: Jan. 4, 2016

(65) Prior Publication Data
US 2017/0195832 A1    Jul. 6, 2017

(51) Int. Cl.
H04W 24/00    (2009.01)
H04W 4/02    (2009.01)
H04B 17/27    (2015.01)

(52) U.S. Cl.
CPC .............. *H04W 4/02* (2013.01); *H04B 17/27* (2015.01)

(58) Field of Classification Search
CPC ...... H04W 4/02; H04W 4/023; H04W 4/0258
USPC ................. 455/456.1, 456.5, 456.6
See application file for complete search history.

(56) References Cited

U.S. PATENT DOCUMENTS

| 2005/0266855 | A1  | 12/2005 | Zeng et al. |
| 2012/0149380 | A1* | 6/2012  | Olson ............... H04W 36/32 455/443 |
| 2015/0031389 | A1* | 1/2015  | Liu .................. H04W 4/02 455/456.1 |
| 2016/0189186 | A1* | 6/2016  | Fabrikant ........... G06Q 30/0205 705/7.34 |

(Continued)

FOREIGN PATENT DOCUMENTS

WO    2014083494 A2    6/2014
WO    2015118135 A1    8/2015

OTHER PUBLICATIONS

Ester, Martin et al.; A Density-Based Algorithm for Discovering Clusters in Large Spatial Databases with Noise; Published in Proceedings of 2nd International Conference on Knowledge Discovery and Data Mining (KDD-96); Aug. 2-4, 1996; Portland, Oregon; 6 pp.

(Continued)

*Primary Examiner* — Temica M Beamer
(74) *Attorney, Agent, or Firm* — Armstrong Teasdale LLP

(57) ABSTRACT

A wireless device detection computer device for determining the location of wireless device is provided. The WDD computer device includes a processor in communication with a memory. The processor is configured to receive a plurality of status messages from a plurality of anchor points. Each status message of the plurality of status messages includes a received signal strength associated with a first wireless signal received at the corresponding anchor (Continued)

point from a first wireless device. The processor is also configured to determine a plurality of subsets of the plurality of anchor points, determine a potential location of the first wireless device for each of the plurality of subsets, generate a clustering of the plurality of potential locations, select a first group of the plurality of subsets based on the clustering, and calculate a final location of the first wireless device.

20 Claims, 4 Drawing Sheets

(56) References Cited

U.S. PATENT DOCUMENTS

2016/0302032 A1* 10/2016 Chesnutt ............... H04W 4/02

OTHER PUBLICATIONS

Almuzaini, Khalid K et al.; Localization in Wireless Networks Using Decision Trees and K-Means Clustering; Published in 2012 IEEE Vehicular Technology Conference (VTC Fall); Sep. 3-6, 2012;Quebec City, QC, Canada 5 pp.

So, Hing Cheung et al.; Linear Least Squares Approach for Accurate Received Signal Strength Based Source Localization; IEEE Transactions on Signal Processing; vol. 59., No. 8; Aug. 2011; pp. 4035-4040.

Lin, Lanxin et al.; Best Linear Unbiased Estimator Algorithm for Received Signal Strength Based Localization; 19th European Signal Processing Conference (EUSIPCO 2011); Aug. 29-Sep. 2, 2011; Barcelona, Spain; 5 pp.

Tarrio, Paula et al.; A New Positioning Technique for RSS-Based Localization Based on a Weighted Least Squares Estimater; Published in IEEE International Symposium on Wireless Communication Systems (ISWCS 08); Oct. 21-24, 2008; Reykjavik, Iceland; pp. 633-637.

Waadt, Andreas E. et al.; Maximum Likelihood Localization Estimation Based on Received Signal Strength; Published in 2010 3rd International Symposium on Applied Sciences in Biomedical and Communication Technologies (ISABEL); Nov. 7-10, 2010; Rome, Italy; 5 pp.

EPO Extended Search Report for related application 16193798.2 dated Jun. 12, 2017; 5 pp.

* cited by examiner

SYSTEM AND METHOD FOR ESTIMATING WIRELESS DEVICE POSITIONS

BACKGROUND

The field of the present disclosure relates generally to estimating positions of wireless devices and, more specifically, to estimating the positions of wireless devices using wireless signal strength localization, clustering, and reduction.

Wireless devices are becoming more prevalent. In specific, some wireless devices have small form factors, low capabilities, and are battery powered. These wireless devices usually function as sensors, controllers, or human input devices. These wireless devices may have low computing power and limited memory. The wireless devices may also be mobile. In many situations, these wireless devices are configured to communicate with permanently located devices over wireless protocols. It is desirable to determine an efficient and effective way to locate these devices.

BRIEF DESCRIPTION

In one aspect, a wireless device detection (WDD) computer device for determining the location of wireless device is provided. The WDD computer device includes a processor in communication with a memory. The processor is configured to receive a plurality of status messages from a plurality of anchor points. Each status message of the plurality of status messages includes a received signal strength associated with a first wireless signal received at the corresponding anchor point from a first wireless device. The processor is also configured to determine a plurality of subsets of the plurality of anchor points. Each subset includes a number of anchor points of the plurality of anchor points. The processor is further configured to determine a potential location of the first wireless device based, at least in part, on the corresponding received signal strengths for each of the plurality of subsets, generate a clustering of the plurality of potential locations, select a first group of the plurality of subsets based on the clustering, and calculate a final location of the first wireless device based on the received signal strengths received from the anchor points included in the first group of subsets.

In another aspect, a system for determining the location of a wireless device is provided. The system includes a plurality of anchor points configured to receive a wireless signal from a first wireless device, determine a received signal strength for the wireless signal, and transmit a status message including the received signal strength to a wireless device detection (WDD) computer device. The system also includes a WDD computer device that includes a processor and a memory coupled to the processor. The WDD computer device is in communication with the plurality of anchor points. The WDD computer device is configured to receive a plurality of status messages from the plurality of anchor points and determine a plurality of subsets of the plurality of anchor points. Each subset includes a number of anchor points of the plurality of anchor points. The WDD computer device is also configured to determine a potential location of the first wireless device based, at least in part, on the corresponding received signal strengths for each of the plurality of subsets, generate a clustering of the plurality of potential locations, select a first group of the plurality of subsets based on the clustering, and calculate a final location of the first wireless device based on the received signal strengths received from the anchor points included in the first group of subsets.

In yet another aspect, a method for determining the location of a wireless device is provided. The method is implemented using a wireless device detection (WDD) computer device. The WDD computer device includes a processor in communication with a memory. The method includes receiving a plurality of status messages from a plurality of anchor points. Each status message of the plurality of status messages includes a received signal strength associated with a first wireless signal received at the corresponding anchor point from a first wireless device. The method also includes determining a plurality of subsets of the plurality of anchor points. Each subset includes a number of the plurality of anchor points. The method further includes determining a potential location of the first wireless device based, at least in part, on the corresponding received signal strengths for each of the plurality of subsets, generating a clustering of the plurality of potential locations, selecting a first group of the plurality of subsets based on the clustering, and calculating a final location of the first wireless device based on the received signal strengths received from the anchor points included in the first group of subsets.

DETAILED DESCRIPTION

Figure 1:
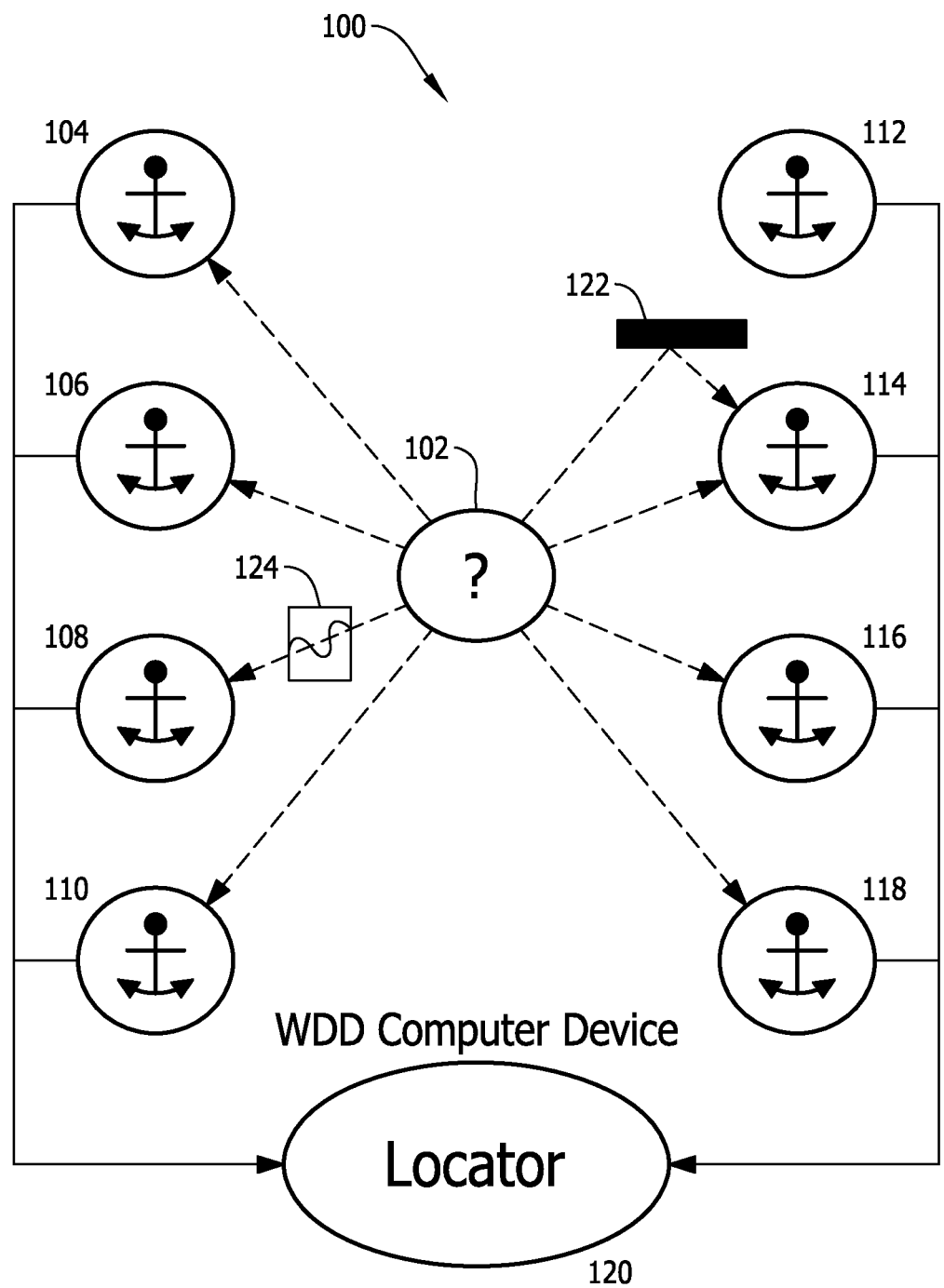
FIG. 1 illustrates a diagram of an example detection scenario in accordance with one embodiment of the present disclosure.

The implementations described herein relate to systems and methods for estimating positions of wireless devices and, more specifically, to estimating the positions of wireless devices using wireless signal strength localization, clustering, and reduction. More specifically, a wireless device detection ("WDD") computer devices receive a plurality of status messages from a plurality of anchor points, wherein each status message of the plurality of status messages includes a received signal strength associated with a first wireless signal received at the corresponding anchor point from a first wireless device. In some embodiments, each status message a unique identifier associated with the first wireless device. In some embodiments, the first wireless signal is one of a locator signal and normal message traffic and the first wireless signal is one of a Bluetooth signal, an 802.15 (ZigBee) signal, an IPv6 over Low power Wireless Personal Area Networks (6LowPAN) signal, and an 802.11 (Wi-Fi) signal.

In some embodiments, the WDD computer device compares the received signal strength associated with each anchor point with a first predetermined threshold and removes the corresponding anchor point from the plurality of anchor points upon determining that the corresponding received signal strength does not exceed the first predetermined threshold. In other embodiments, the WDD computer device compares the received signal strength associated with each anchor point with a second predetermined threshold and removes the corresponding anchor point from the plurality of anchor points upon determining that the corresponding received signal strength exceeds the second predetermined threshold.

The WDD computer device determines a plurality of subsets of the plurality of anchor points, wherein each subset includes a number of anchor points of the plurality of anchor points. In some embodiments, the number of anchor points included within each of the plurality subsets is based on a predetermined threshold number. In other embodiments, the predetermined threshold number is based on a number of anchor points required to locate a wireless device. The WDD computer device stores a plurality of locations, wherein each location is associated with one of the plurality of anchor points. For each of the plurality of subsets, the WDD computer device determines a potential location of the first wireless device based, at least in part, on the locations of the anchor points in the subset and the corresponding received signal strengths. The WDD computer device generates a clustering of the plurality of potential locations. The WDD computer device selects a first group of the plurality of subsets based on the clustering. The WDD computer device determines the first group based on the largest cluster of potential locations. The WDD computer device calculates a final location of the first wireless device based on the received signal strengths received from the anchor points included in the first group of subsets.

Described herein are computer systems such as the WDD computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 illustrates a diagram of an example detection scenario 100 in accordance with one embodiment of the present disclosure. Scenario 100 includes a wireless device 102. In the example embodiment, the location of wireless device 102 is not known. Scenario 100 also includes a plurality of anchors (also known as anchor points) 104-118. Each of anchors 104-118 is capable of receiving wireless signals from wireless device 102, determining the strength of the wireless signal from wireless device 102, and transmitting the determined wireless signal strength to a wireless device detection (WDD) computer device 120. The wireless signal strength is representative of the strength of the signal when it reaches the corresponding anchor. This strength is reduced over distance and can be used to determine the relative distance of wireless device 102 from anchor points 104-118. WDD computer device 120 is configured to receive the received signal strength values from anchor points 104-118. In the example embodiments, WDD computer device 120 is able to determine the location of wireless device 102 using the received signal strengths in a path loss model. If the location of multiple anchor points 104-118 is known, WDD computer device 120 may use the least linear squares method to calculate the location of wireless device 102 using the received signal strengths.

However, in some embodiments, the wireless signal transmitted from wireless device 102 may not reach all of the anchors 104-118. For example, obstructions 122 and 124 may interfere with the wireless signal. In this example, obstruction 122 is a reflective surface that blocks the wireless signal from reaching anchor 112 and instead reflects the wireless signal to anchor 114. In this example, anchor 114 receives the wireless signal twice once at an accurate strength and once at a reflected strength. Obstruction 124 blocks some of the wireless signal, so that the signal that anchor 108 receives is reduced. These changes in received signal strength affect the accuracy of the location of wireless device 102 that WDD computer device 120 calculates. For example, the weaker received signal strength detected by anchor 108 would move the calculated position of wireless device 102 away from anchor 108.

Scenario 100 may be, for example, the interior of an airplane cabin. In this example, wireless device 102 may be a wireless call button or an overhead light control. A passenger may press wireless call button 102. WDD computer device 120 may then determine which call button (wireless device 102) was pressed and notify the crew of the airplane. This would replace the need for a wired button, where the wires increase the weight of the airplane. Another example of wireless device 102 in an airplane could include, but is not limited to, being attached to safety equipment (i.e., life vests) to prevent loss.

Scenario 100 could also be on a factory floor. Wireless device 102 could be attached to hand tools, parts, and part bins to track their location in the factory. Wireless device 102 could also be wearable devices provided to personnel to facilitate alerting personnel to safety issues at their location or to dispatch the nearest qualified personnel to a location.

Scenario 100 could also be in a convention hall or office building. Wireless device 102 could be a relocatable, replaceable wireless sensor for temperature, humidity, etc. In this scenario 100, a smart heating, ventilation, and air conditioning (HVAC) system could direct airflow based on data from sensors based on the sensor location. This would also assist in the retrofitting of older buildings.

Scenario 100 could also be at an airport for tracking parts, equipment, and personnel to reduce delays due to searching for the aforementioned. While the equipment, vehicles, and personnel could use Global Positioning System (GPS) tracking, GPS has high power consumption requirements. GPS is also ineffective when the item or person being tracked enters an indoor location, such as a hanger.

Figure 2:
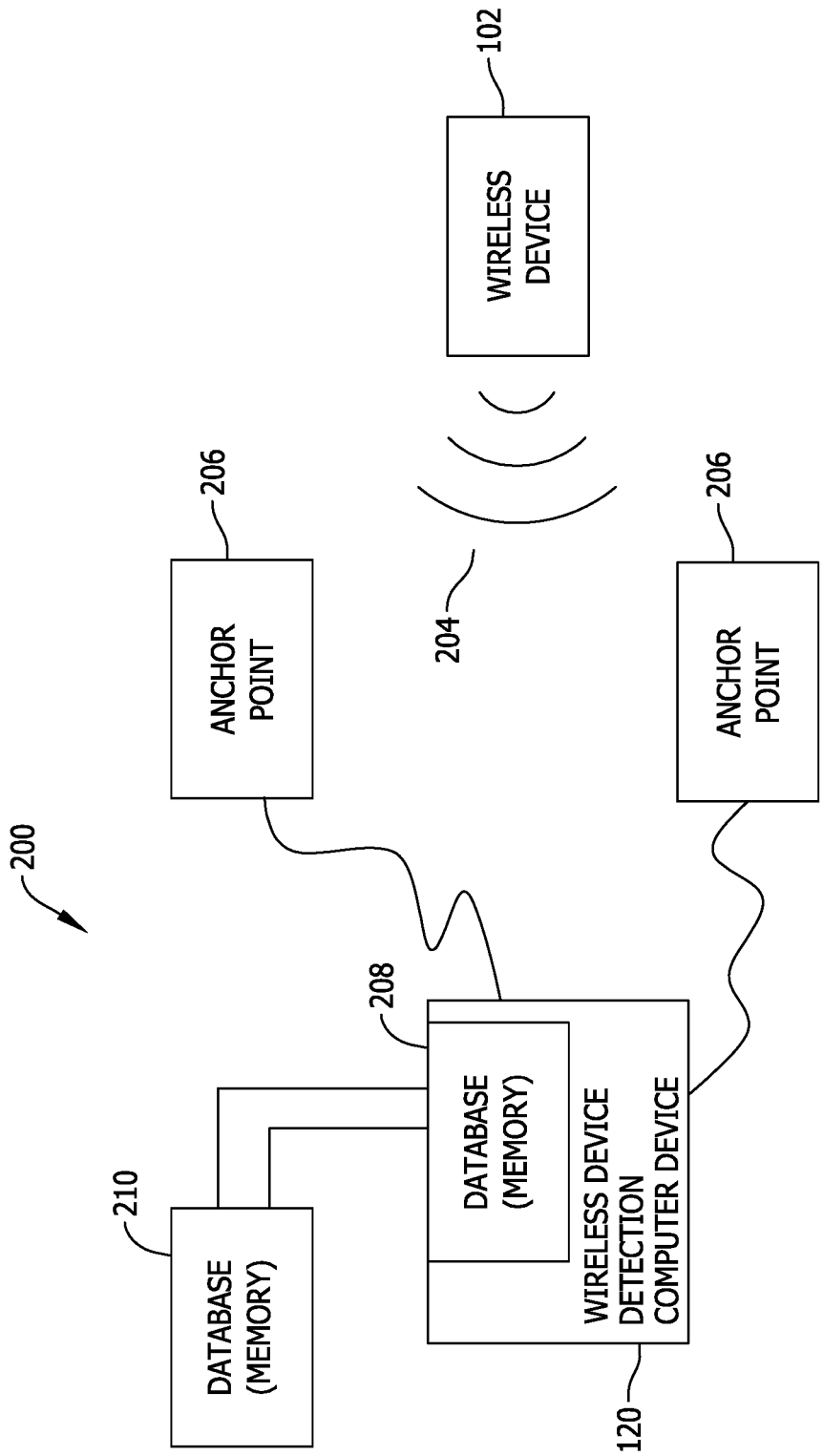
FIG. 2 is a simplified block diagram of an example system for determining the location of a wireless device in accordance with one embodiment of the present disclosure.

FIG. 2 is a simplified block diagram of an example system for determining the location of wireless device 102 (shown in FIG. 1) in accordance with one embodiment of the present disclosure. System 200 includes WDD computer device 120, shown in FIG. 1, configured to estimate a location of wireless device 102 by using the received signal strengths of known anchor points 206. As described below in more detail, WDD computer device 120 is configured to receive a plurality of received signal strengths from a plurality of anchor points 206, determine a plurality of subsets of the plurality of anchor points 206, determine a potential location of the first wireless device based, at least in part, on the corresponding received signal strengths for each of the plurality of subsets, generate a clustering of the plurality of potential locations, select a first group of the plurality of subsets based on the clustering, and calculate a final location of the first wireless device 102 based on the received signal strengths received from the anchor points 206 included in the first group of subsets.

In the example embodiment, wireless device 102 has low size, weight, and power. Wireless device 102 may have relatively fixed location or a movable location. In some embodiments, wireless device 102 is replaced at the end of its battery life. In the example embodiment, wireless device 102 has low computing power, and limited memory. Wireless device 102 is capable of transmitting a wireless signal 204 via a wireless communication protocol, such as, but not limited to 802.11 (Wi-Fi), 802.15 (ZigBee), IPv6 over Low power Wireless Personal Area Networks (6LowPAN), Bluetooth, or other efficient wireless communication protocol. In some embodiments, wireless signal 204 is normal communication traffic, in other embodiments, wireless signal 204 is a locator signal that wireless device 102 transmits for location purposes. In some further embodiments, wireless device 102 may be a larger and more powerful device, such as, but not limited to, a laptop computer, a personal digital assistant (PDA), a cellular phone, a smartphone, a tablet, a phablet, or other web-based connectable equipment. In the example embodiment, each wireless device 102 and each anchor point 206 is associated with a unique identifier. In the example embodiment, wireless device 102 transmits its unique identifier in wireless signal 204.

Anchor points 206 may include, but are not limited to anchors 104-118 shown in FIG. 1. Anchor points 206 are capable of receiving wireless signal 204. Anchor points 206 are configured to determine the signal strength of wireless signal 204. Anchor points 206 are in communication with WDD computer device 120. In the example embodiment, anchor points 206 are in direct wired connection with WDD computer device 120. In other embodiments, anchor devices are connected to WDD computer device 120 through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, a wireless communication protocol connection, and a cable modem. Anchor points 206 can be any device capable of acting as described herein including, but not limited to, a router, a repeater, a hub, a desktop computer, a laptop computer, a personal digital assistant (PDA), a cellular phone, a smartphone, a tablet, a phablet, or other web-based connectable equipment.

A database server 208 is communicatively coupled to a database 210 that stores data. In one embodiment, database 210 includes the locations of each of anchor points 206, calculating rules and settings, and a listing of potential wireless devices 102. In the example embodiment, database 210 is stored remotely from WDD computer device 120. In some embodiments, database 210 is decentralized. In the example embodiment, a person can access database 210 via a client system (not shown) by logging onto WDD computer device 120, as described herein.

Figure 3:
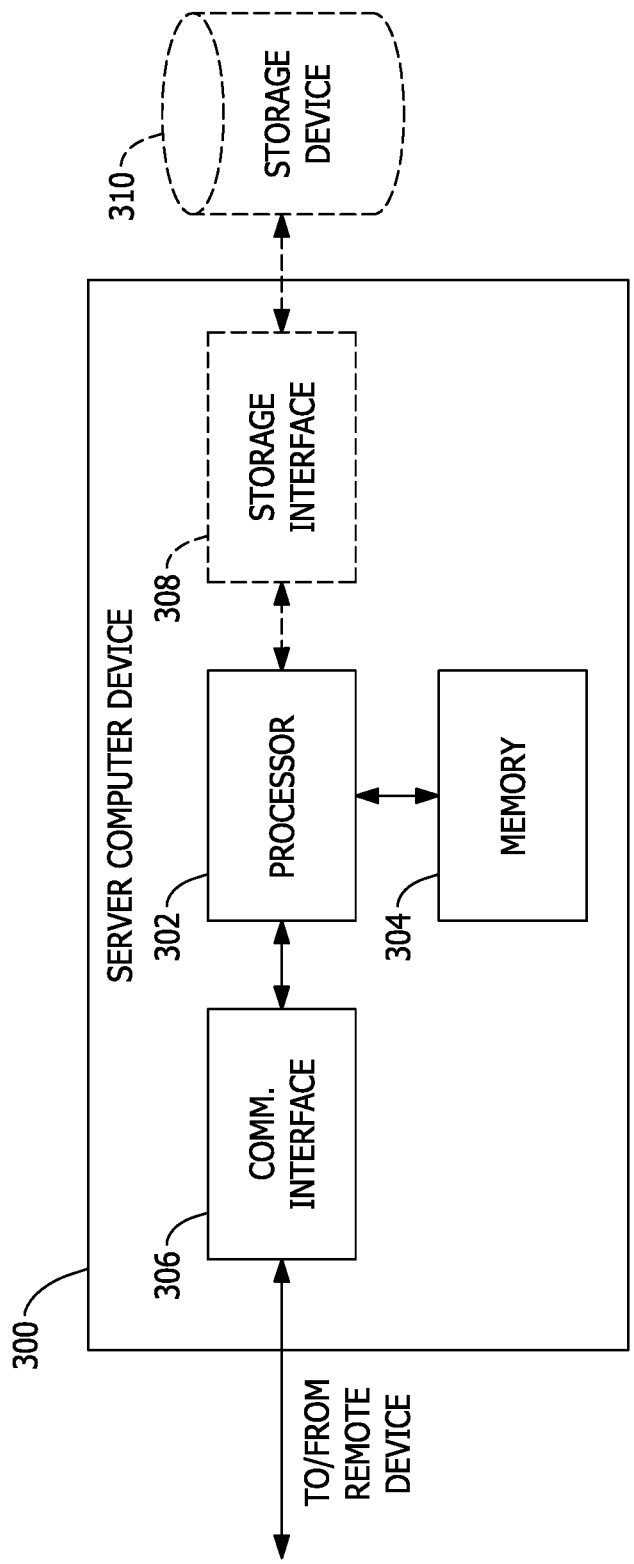
FIG. 3 illustrates an example configuration of a server shown in FIG. 2, in accordance with one embodiment of the present disclosure.

FIG. 3 illustrates an example configuration of a server shown in FIG. 2, in accordance with one embodiment of the present disclosure. Server computer device 300 may include, but is not limited to, WDD computer device 210 shown in FIG. 2. Server computer device 300 also includes a processor 302 for executing instructions. Instructions may be stored in a memory area 304. Processor 302 may include one or more processing units (e.g., in a multi-core configuration).

Processor 302 is operatively coupled to a communication interface 306 such that server computer device 300 is capable of communicating with a remote device such as another server computer device 300, anchors 104-118 (shown in FIG. 1), anchor points 206 (shown in FIG. 2), or one or more client systems (not shown). In the example embodiment, communication interface 306 receives data from anchor points 206, as illustrated in FIG. 2.

Processor 302 may also be operatively coupled to a storage device 310. Storage device 310 is any computer-operated hardware suitable for storing and/or retrieving data, such as, but not limited to, data associated with database 210 (shown in FIG. 2). In some embodiments, storage device 310 is integrated in server computer device 300. For example, server computer device 300 may include one or more hard disk drives as storage device 310. In other embodiments, storage device 310 is external to server computer device 300 and may be accessed by a plurality of server computer devices 300. For example, storage device 310 may include a storage area network (SAN), a network attached storage (NAS) system, and/or multiple storage units such as hard disks and/or solid state disks in a redundant array of inexpensive disks (RAID) configuration.

In some embodiments, processor 302 is operatively coupled to storage device 310 via a storage interface 308. Storage interface 308 is any component capable of providing processor 302 with access to storage device 310. Storage interface 308 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 302 with access to storage device 310.

Processor 302 executes computer-executable instructions for implementing aspects of the disclosure. In some embodiments, processor 302 is transformed into a special purpose microprocessor by executing computer-executable instructions or by otherwise being programmed. For example, processor 302 is programmed with the instruction such as those illustrated in FIG. 4.

Figure 4:
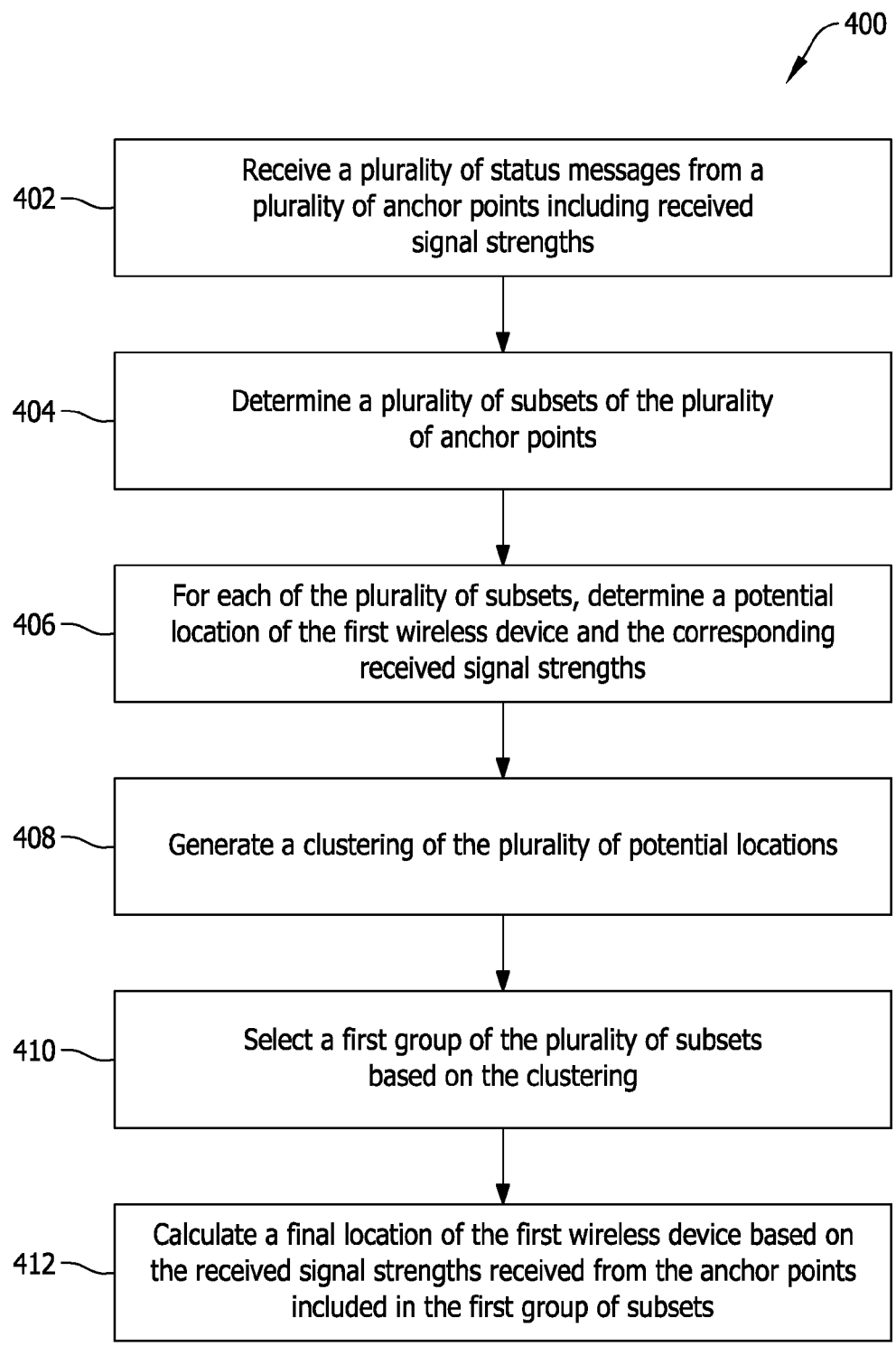
FIG. 4 is a flow chart of a process for determining the location of a wireless device, such as in the scenario shown in FIG. 1 and using the system shown in FIG. 2.

FIG. 4 is a flow chart of a process for determining the location of wireless device 102 (shown in FIG. 1), such as in scenario 100 (shown in FIG. 1) and using system 200 (shown in FIG. 2). Process 400 may be implemented by a computing device, for example WDD computer device 120 (shown in FIG. 1).

In the example embodiment, WDD computer device 120 receives 402 a plurality of status messages from a plurality of anchor points 206 (shown in FIG. 2). In the example embodiment, each of the status messages includes a received signal strength that the corresponding anchor point 206 measured based on a wireless signal 204 (shown in FIG. 2) that the anchor point 206 received from wireless device 102. In some embodiments, the status message includes a unique identifier for wireless device 102 that was included in wireless signal 204.

In some embodiments, WDD computer device 120 analyzes each of the received strength signals. In these embodiments, WDD computer device 120 removes anchor points 206 from further consideration when the received signal strength is below a certain predetermined threshold. For example, if the received signal strength from anchor 112, shown in FIG. 1, is extremely low, for example, below the predetermined threshold, then WDD computer device 120 removes anchor 112 from being used in any further steps of process 400. In some further embodiments, WDD computer device 120 removes an anchor point if the received signal strength exceeds a different predetermined threshold, for example, the received signal strength is too high. For example, wireless signal 204 arrives at anchor 114 (shown in FIG. 1) twice, once directly from wireless device 102 and once due to a reflection from obstruction 122. In this example, anchor 114 may add or otherwise combine the two received signal strengths together. In this example, WDD computer device 120 determines that the received signal strength from anchor 114 is too high, for example, exceeds the appropriate threshold. WDD computer device 120 removes anchor 114 from being used in any further steps of process 400 for wireless device 102.

In some embodiments, WDD computer device 120 receives a single status message from each anchor point 206. In other embodiments, to increase accuracy, WDD computer device 120 receives a plurality of status messages from each of the plurality of anchor points 206, which WDD computer device 120 uses in process 400. In these other embodiments, WDD computer device 120 analyzes the number of status messages that WDD computer device 120 received from each of anchor points 206. If the number of status messages associated with an anchor point 206 is significantly lower that the amount received from the other anchor points 206, then WDD computer device 120 may remove that anchor point 206 from being used in any further steps of process 400 for wireless device 102. For example, the WDD computer device 120 may compare a number of status messages received from each of the plurality of anchor points 206 to a predetermined threshold and may remove the corresponding anchor point 206 from the plurality of anchor points 206 upon determining that the number of status messages received from the anchor point does not exceed the predetermined threshold. In other further embodiments, WDD computer device 120 analyzes the received signal strength of each received status message of the plurality of received status messages for anchor point 206 and removes any where the signal strength is too high or too low as described above.

WDD computer device 120 determines 404 a plurality of subsets of the plurality of anchor points 206. Each subset includes a certain number of anchor points 206. For example, in scenario 100 there are eight anchors 104-118. WDD computer device 120 divides them up into a plurality of subsets. Each subset contains N different anchor points 206, but each anchor point 206 may be in multiple subsets. For example, in the case of N equals 4, Table 1 shows an exemplary set of subsets.

TABLE 1

| SUBSET | ANCHORS | | | |
| --- | --- | --- | --- | --- |
| 1 | 104 | 106 | 108 | 110 |
| 2 | 112 | 114 | 116 | 118 |
| 3 | 104 | 112 | 106 | 114 |
| 4 | 108 | 116 | 110 | 118 |
| 5 | 104 | 108 | 112 | 116 |

TABLE 1 above shows just a portion of the subsets that could be determined 404 when N is 4. In the example embodiment, the optimal number of anchor points in each subset is two times the number of axes that are being used. For example, in a two dimensional environment, the optimal number of anchor points is four. In other embodiments, the number of anchor points is set by the user or the localization algorithm being used. In some embodiments, the number of anchor points included within each of the plurality of subsets may be based on a predetermined threshold number. In some embodiments, the predetermined threshold number may be based on a number of axes used for the potential locations. In some embodiments, anchor points are chosen to be included in each subset based on a predetermined algorithm. In other embodiments, the anchor points in each subset are chosen randomly.

For each of the subsets, WDD computer device 120 determines 406 a potential location of wireless device 102 using the received signal strengths. In the example embodiment, database 210 (shown in FIG. 2) stores the location for each of anchors 104-118. WDD computer device 120 uses the received signal strengths and the locations of each of the anchor points 206 in the subset to determine 406 the distance of wireless device 102 from each corresponding anchor point 206 using a path loss model, such as Equation 1.

$$p_r = K \frac{p_t}{d^\alpha} \qquad \text{Eq. 1}$$

where $p_r$ is the received signal strength, $p_t$ is the signal strength at transmission, K is a system dependent multiplicative gain constant, and a is the pass loss exponent. WDD computer device 120 inputs the calculated signal strengths and anchor locations into a received signal strength (RSS) localization algorithm to determine 406 the potential location of wireless device 102 for each of the subsets. RSS localization algorithms include, but are not limited to, linear least squares estimation, maximum likelihood estimation, weighted least squares estimation, and any other localization algorithm that will allow the system to work as described herein. For example, for subset 3 shown above in TABLE 1, WDD computer device 120 determines 406 a potential location of wireless device 102 using the received signal strengths of anchors 104, 106, 112, and 114.

WDD computer device 120 generates 408 a clustering of the plurality of potential locations. In a two dimensional embodiment, WDD computer device 120 plots the potential locations from each of the subsets on a two dimensional graph. WDD computer device 120 selects 410 a first group of the subsets based on the clustering.

In the example embodiment, WDD computer device 120 determines the largest cluster of potential locations in the generated clustering. In the example embodiment, WDD computer device 120 uses a cluster detection algorithm to determine the largest cluster. In the example embodiment, the cluster detection algorithm uses DBScan, which uses the density of the potential locations and the distance between the potential locations to determine the largest cluster. In other embodiments, the cluster detection algorithm includes, but is not limited to K-Means, Spectral Clustering, and any other algorithm that allows the system to work as described herein. The purpose of selecting the subsets in the largest cluster is to remove the subsets that are outliers and have potential locations that are significantly different from the potential locations calculated for the majority of the subsets. In the example embodiment, the maximum distance between potential locations in the same cluster is predetermined and stored in database 210. By selecting only the subsets with potential locations within a certain distance of each other, WDD computer device 120 only selects anchor points whose signal strength exhibit similar path loss model parameters. By removing anchor points 206 that contribute to potential locations outside of the cluster, the accuracy of the final location of wireless device 102 is improved as anchor points 206 with obstructions 122 and 124 (shown in FIG. 1) are removed from the final calculations.

WDD computer device 120 calculates 412 a final location of wireless device 102 based on the received signal strengths from anchor points 206 included in the first group of subsets. WDD computer device 120 determines each of the anchor points 206 included in the first group by determining which anchor points 206 are included in each of the subsets in the first group. WDD computer device 120 retrieves the received signal strength for each anchor point 206 determined to be in the first group. WDD computer device 120 calculates 412 the final location using those received signal strengths. In the example embodiment, WDD computer device 120 uses a path-loss model based estimation, such as linear least squares to calculate 412 the final location of wireless device 102.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The implementations described herein relate to systems and methods for estimating positions of wireless devices and, more specifically, to estimating the positions of wireless devices using wireless signal strength localization, clustering, and reduction. More specifically, a wireless device detection ("WDD") computer devices receive a plurality of status messages from a plurality of anchor points, wherein each status message of the plurality of status messages includes a received signal strength associated with a first wireless signal received at the corresponding anchor point from a first wireless device. In some embodiments, each status message a unique identifier associated with the first wireless device. In some embodiments, the first wireless signal is one of a locator signal and normal message traffic and the first wireless signal is one of a Bluetooth signal, an 802.15 (ZigBee) signal, an IPv6 over Low power Wireless Personal Area Networks (6LowPAN) signal, and an 802.11 (Wi-Fi) signal.

In some embodiments, the WDD computer device compares the received signal strength associated with each anchor point with a first predetermined threshold and removes the corresponding anchor point from the plurality of anchor points upon determining that the corresponding received signal strength does not exceed the first predetermined threshold. In other embodiments, the WDD computer device compares the received signal strength associated with each anchor point with a second predetermined threshold and removes the corresponding anchor point from the plurality of anchor points upon determining that the corresponding received signal strength exceeds the second predetermined threshold.

The WDD computer device determines a plurality of subsets of the plurality of anchor points, wherein each subset includes a number of anchor points of the plurality of anchor points. In some embodiments, the number of anchor points included within each of the plurality subsets is based on a predetermined threshold number. In other embodiments, the predetermined threshold number is based on a number of anchor points required to locate a wireless device. The WDD computer device stores a plurality of locations, wherein each location is associated with one of the plurality of anchor points. For each of the plurality of subsets, the WDD computer device determines a potential location of the first wireless device based, at least in part, on the locations of the anchor points in the subset and the corresponding received signal strengths. The WDD computer device generates a clustering of the plurality of potential locations. The WDD computer device selects a first group of the plurality of subsets based on the clustering. The WDD computer device determines the first group based on the largest cluster of potential locations. The WDD computer device calculates a final location of the first wireless device based on the received signal strengths received from the anchor points included in the first group of subsets.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wireless device detection (WDD) computer device for determining the location of wireless device, said WDD computer device comprising:
    a processor in communication with a memory, said processor configured to:
        receive a plurality of status messages from a plurality of anchor points, wherein each status message of the plurality of status messages includes a received signal strength associated with a first wireless signal received at the corresponding anchor point from a first wireless device;
        determine a plurality of subsets of the plurality of anchor points, wherein each subset includes a number of anchor points of the plurality of anchor points;
        calculate, for each subset of the plurality of subsets, a potential location of the first wireless device based, at least in part, on the corresponding received signal strengths from each of the plurality of anchor points in the corresponding subset;
        generate a clustering of the plurality of potential locations;
        select a first group of the plurality of subsets based on the clustering; and
        calculate a final location of the first wireless device based on the received signal strengths received from the anchor points included in the first group of subsets.

2. A WDD computer device in accordance with claim 1, wherein said processor is further configured to:
    store a plurality of locations, wherein each location is associated with one of the plurality of anchor points; and
    for each of the plurality of subsets, determine the potential location of the first wireless device based on the locations of the anchor points in the subset and the corresponding received signal strengths.

3. A WDD computer device in accordance with claim 1, wherein said processor is further configured to select the first group based on the clustering of potential locations, wherein the potential location associated with each subset is within a predetermined distance of each other.

4. A WDD computer device in accordance with claim 1, wherein said processor is further configured to:
    compare the received signal strength associated with each anchor point with a first predetermined threshold; and
    remove the corresponding anchor point from the plurality of anchor points upon determining that the corresponding received signal strength does not exceed the first predetermined threshold.

5. A WDD computer device in accordance with claim 1, wherein said processor is further configured to:
    compare the received signal strength associated with each anchor point with a second predetermined threshold; and
    remove the corresponding anchor point from the plurality of anchor points upon determining that the corresponding received signal strength exceeds the second predetermined threshold.

6. A WDD computer device in accordance with claim 1, wherein said processor is further configured to:
    compare a number of status messages received from each of the plurality of anchor points to a predetermined threshold;
    remove the corresponding anchor point from the plurality of anchor points upon determining that the number of status messages received from the anchor point does not exceed the predetermined threshold.

7. A WDD computer device in accordance with claim 1, wherein each status message of the plurality of status messages includes a unique identifier associated with the first wireless device.

8. A WDD computer device in accordance with claim 1, wherein the first wireless signal is one of a Bluetooth signal, an 802.15 (ZigBee) signal, an IPv6 over Low power Wireless Personal Area Networks (6LowPAN) signal, and an 802.11 (Wi-Fi) signal.

9. A WDD computer device in accordance with claim 1, wherein the number of anchor points included within each of the plurality of subsets is based on a predetermined threshold number.

10. A WDD computer device in accordance with claim 9, wherein the predetermined threshold number is based on a number of axes used for the potential locations.

11. A WDD computer device in accordance with claim 1, wherein the first wireless signal is one a locator signal and normal message traffic.

12. A system for determining the location of a wireless device, said system comprising:
    a plurality of anchor points configured to:
        receive a wireless signal from a first wireless device;
        determine a received signal strength for the wireless signal; and transmit a status message including the received signal strength to a wireless device detection (WDD) computer device;

a WDD computer device comprising a processor and a memory coupled to said processor, said WDD computer device in communication with said plurality of anchor points, and configured to:

receive a plurality of status messages from said plurality of anchor points;

determine a plurality of subsets of said plurality of anchor points, wherein each subset includes a number of anchor points of said plurality of anchor points;

calculate, for each subset of the plurality of subsets, a potential location of the first wireless device based, at least in part, on the corresponding received signal strengths from each of the plurality of anchor points in the corresponding subset;

generate a clustering of the plurality of potential locations;

select a first group of the plurality of subsets based on the clustering; and calculate a final location of the first wireless device based on the received signal strengths received from the anchor points included in the first group of subsets.

13. A system in accordance with claim 12, wherein said WDD computer device is further configured to:

store a plurality of locations, wherein each location is associated with one of said plurality of anchor points; and for each of the plurality of subsets, determine the potential location of the first wireless device based on the locations of the anchor points in the subset and the corresponding received signal strengths.

14. A system in accordance with claim 12, wherein said WDD computer device is further configured to select the first group based on the clustering of potential locations, wherein the potential location associated with each subset is within a predetermined distance of each other.

15. A system in accordance with claim 12, wherein the status message further includes a unique identifier associated with the first wireless device.

16. A method for determining the location of a wireless device, said method implemented using a wireless device detection (WDD) computer device, said WDD computer device comprising a processor in communication with a memory, said method comprising:

receiving a plurality of status messages from a plurality of anchor points, wherein each status message of the plurality of status messages includes a received signal strength associated with a first wireless signal received at the corresponding anchor point from a first wireless device;

determining a plurality of subsets of the plurality of anchor points, wherein each subset includes a number of anchor points of the plurality of anchor points;

calculating, for each subset of the plurality of subsets, a potential location of the first wireless device based, at least in part, on the corresponding received signal strengths from each of the plurality of anchor points in the corresponding subset;

generating a clustering of the plurality of potential locations;

selecting a first group of the plurality of subsets based on the clustering; and calculating a final location of the first wireless device based on the received signal strengths received from the anchor points included in the first group of subsets.

17. A method in accordance with claim 16, further comprising:

storing a plurality of locations, wherein each location is associated with one of the plurality of anchor points; and for each of the plurality of subsets, determine the potential location of the first wireless device based on the locations of the anchor points in the subset and the corresponding received signal strengths.

18. A method in accordance with claim 16, further comprising selecting the first group based on the clustering of potential locations, wherein the potential location associated with each subset is within a predetermined distance of each other.

19. A method in accordance with claim 16, further comprising:

comparing the received signal strength associated with each anchor point with a first predetermined threshold; and removing the corresponding anchor point from the plurality of anchor points upon determining that the corresponding received signal strength does not exceed the first predetermined threshold.

20. A method in accordance with claim 16, wherein each status message of the plurality of status messages includes a unique identifier associated with the first wireless device.

* * * * *